(12) United States Patent
Mudigonda et al.

(10) Patent No.: US 9,509,662 B2
(45) Date of Patent: Nov. 29, 2016

(54) TECHNIQUES FOR PROVIDING SERVICES TO MULTIPLE TENANTS VIA A SHARED END-POINT

(71) Applicant: Microsoft Corporation, Redmond, WA (US)

(72) Inventors: Uma Mahesh Mudigonda, Hyderabad (IN); Shiva Kumar Thangapandi, Hyderabad (IN); Deepak Narula, Hyderabad (IN); Aanand Ramachandran, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/495,613

(22) Filed: Sep. 24, 2014

(65) Prior Publication Data

US 2016/0087941 A1    Mar. 24, 2016

(51) Int. Cl.
H04L 29/06 (2006.01)
H04L 12/46 (2006.01)
H04L 29/12 (2006.01)
H04L 29/08 (2006.01)

(52) U.S. Cl.
CPC ....... *H04L 63/0272* (2013.01); *H04L 12/4641* (2013.01); *H04L 61/303* (2013.01); *H04L 61/35* (2013.01); *H04L 63/029* (2013.01); *H04L 63/0428* (2013.01); *H04L 67/02* (2013.01)

(58) Field of Classification Search
CPC .......................... H04L 63/0272; H04L 63/029
See application file for complete search history.

(56) References Cited

U.S. PATENT DOCUMENTS 7,340,519 B1 *   3/2008   Golan ................. H04L 12/2856
                                                         709/225

2012/0281706 A1   11/2012   Agarwal et al.
2013/0142201 A1    6/2013   Kim et al.
2013/0287026 A1   10/2013   Davie
(Continued)

FOREIGN PATENT DOCUMENTS

WO         2014086047         6/2014

OTHER PUBLICATIONS

Anderson, What's New in 2012 R2: Hybrid Networking, Aug. 2013, Retrieved from the Internet on Oct. 18, 2015: <URL: http://blogs.technet.com/b/in_the_cloud/archive/2013/08/14/what-s-new-in-2012-r2-hybrid-networking.aspx>.*

(Continued)

*Primary Examiner* — Minh Dinh
(74) *Attorney, Agent, or Firm* — Henry Gabryjelski; Kate Drakos; Micky Minhas

(57) ABSTRACT

A service is provided that supports a plurality of tenants. Server(s) of the service are communicatively coupled with a plurality of gateways of the service. Each gateway is configured to support at least one tenant. The server(s) of the service include a network interface, a tenant mapper, and a gateway interface. The network interface is configured to receive connection strings from client devices. Each received connection string includes a service portion that maps to the same public IP address of the service, and also includes a corresponding tenant portion that identifies a tenant. The tenant mapper maps the tenant portions of the connection strings to corresponding gateways. The gateway interface is configured to enable the gateways to establish tunnels between the corresponding client devices and identified tenants. Accordingly, clients are enabled to access multiple tenants of the service via a same public IP address.

21 Claims, 8 Drawing Sheets

(56) References Cited

U.S. PATENT DOCUMENTS

2013/0322446 A1    12/2013    Biswas et al.
2013/0322453 A1    12/2013    Allan

OTHER PUBLICATIONS

Hyper-V Network Virtualization Gateway Architectural Guide, TechNet, Mar. 2014, Retrieved from the Internet on Sep. 15, 2016: <URL: https://web.archive.org/web/20140329211937/http://technet.microsoft.com/en-us/library/jj618319.aspx>.*

Ravi Rao, "Cloud scale multitenant networking stack", Published on: Aug. 2, 2013, Available at: http://blogs.technet.com/b/networking/archive/2013/08/03/cloud-scale-multitenant-networking-stack-and-service.aspx, 4 pages.

Jeuk, et al., "Tenant-ID: Tagging Tenant Assets in Cloud Environments", In 13th IEEE/ACM International Symposium on Cluster, Cloud and Grid Computing (CCGrid), May 13, 2013, 6 pages.

"Connecting multiple on-premises sites to the cloud", Retrieved on: Aug. 16, 2014, Available at: http://technet239.rssing.com/chan-4753999/all_p289.html, 36 pages.

Mysore, et al., "FasTrak: Enabling Express Lanes in Multi-Tenant Data Centers", In Proceedings of the ninth ACM conference on Emerging networking experiments and technologies, Dec. 9, 2013, 12 pages.

"Multi-Tenant VPN with Windows Server 2012 R2", Published on: Oct. 15, 2013, Available at: http://blogs.technet.com/b/networking/archive/2013/10/15/multi-tenant-vpn-with-windows-server-2012-r2.aspx, 6 pages.

"Technical Brief: Offering Scalable Layer 2 Services with VPLS and VLL", In Technical Brief of Brocade, Sep. 20, 2013, 16 pages.

Zhelyazkov, Stanislav, "Network Virtualization (Nvgre) in Windows Server 2012 May Not Work If You Do Not Have Update Kb2779768 Installed", Published on: Mar. 27, 2013, Available at: http://cloudadministrator.wordpress.com/2013/03/page/2/, 11 pages.

Benmessaoud et al., "Microsoft System Center Network Virtualization and Cloud Computing", In Book of Microsoft System Center, Apr. 30, 2014, 94 pages.

International Search Report and Written Opinion Issued in PCT Application No. PCT/US2015/051294, Mailed Date: Dec. 14, 2015, 11 Pages.

Ripke, et al., "Dynamic Port Range Re-Assignments for Address Sharing; draft-rqb-dynamic-port-ranges-02.txt", In Internet Engineering Task Force, Standardworkingdarft, Internet Society 4, Mar. 8, 2010, 12 Pages.

Nelson, Rick, "SSL Offloading, Encryption, and Certificates with NGINX", Retrieved from <<https://www.nginx.com/blog/nginx-ssl/#gs.AvqB9Cw>>, Apr. 30, 2014, 5 Pages.

Bernaerts, Nicolas, "Debian—Share Same Port for HTTPS, SSH and OpenVPN", Retrieved from <<http://bernaerts.dyndns.org/linux/75-debian/210-debian-sslh>>, Aug. 14, 2013, 4 Pages.

"Using Multiple SSL Certificates in Apache with One IP Address", Retrieved from <<https://web.archive.org/web/20140824053158/https://www.digicert.com/ssl-support/apache-multiple-ssl-certificates-using-sni.htm>>, Aug. 24, 2014, 2 Pages.

"Https, Openvpn and SSH on One Port—Thanks to Haproxy—New 314es Den", Retrieved from <<https://314es.pl/https-openvpn-and-ssh-on-one-port-thanks-to-haproxy>>, Sep. 10, 2014, 3 Pages.

* cited by examiner

TECHNIQUES FOR PROVIDING SERVICES TO MULTIPLE TENANTS VIA A SHARED END-POINT

BACKGROUND

A service such as a virtual private network (VPN) extends a private network across a public network, such as the Internet. It enables a computer to send and receive data across shared or public networks as if it is directly connected to the private network, while benefiting from the functionality, security and management policies of the private network. A VPN is created by establishing a virtual point-to-point connection, such as through the use of dedicated connections, virtual tunneling protocols, with or without traffic encryptions.

Different tunneling protocols can be used to provide VPN solutions depending on the technology deployed. In order to enable communication from a device (e.g. a PC, laptop, or handheld device) from anywhere in the Internet, VPN solutions have to ensure that the used communication protocol is able to traverse firewalls and a plethora of devices en-route to the VPN server end-point. SSL (Secure Sockets Layer) (TCP port 443) communication is allowed by wide verity of intermediate devices and hence can traverse firewalls.

Hypertext Transfer Protocol Secure (HTTPS) is a communications protocol for secure communication over a computer network, with especially wide deployment on the Internet. Technically, HTTPS is not a protocol in and of itself, but is the result of layering the Hypertext Transfer Protocol (HTTP) on top of the Secure Sockets Layer/Transport Layer Security (SSL/TLS) protocol, thus adding the security capabilities of SSL/TLS to standard HTTP communications. The use of HTTPS helps to prevent wiretapping and man-in-the-middle attacks on communications.

A problem in using SSL with a VPN as a service is that the VPN service provider has to dedicate a separate public IP (Internet Protocol) address for each tenant of the service, as the destination TCP port has to be 443. This can be expensive, because public IP addresses, specifically in the IPV4 (Internet Protocol version 4) Internet, are a scarce and expensive resource. Furthermore, current VPN gateway solutions are single tenanted, such that each gateway is able to support only a single tenant. In such a scenario, the service provider deploys a separate machine for each tenant.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and computer program products are provided for a service that supports a plurality of tenants with a same IP address. Server(s) of the service are communicatively coupled with a plurality of gateways of the service. Each gateway is configured to support at least one tenant. The server(s) receive connection strings from client devices. Each received connection string includes a service portion that maps to the same public IP address of the service, and also includes a corresponding tenant portion that identifies a corresponding tenant. The tenant portions of the connection strings are mapped to corresponding gateways. A gateway to which a connection string is mapped is enabled to establish a tunnel between the corresponding client device and corresponding identified tenant.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
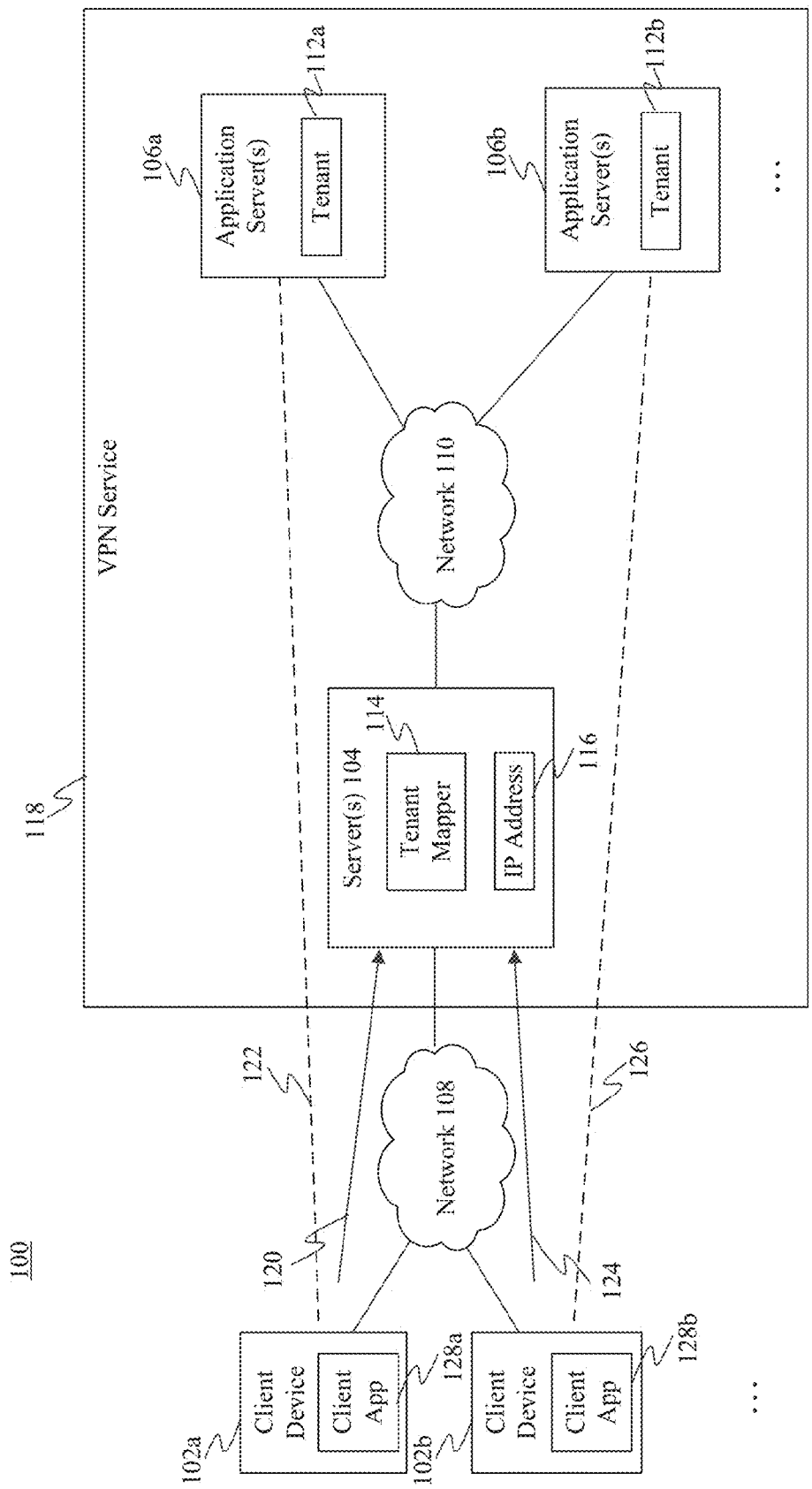
FIG. 1 shows a block diagram of a communications network that includes a virtual private network (VPN) service that hosts multiple tenants, and enables client devices to access the multiple tenants via a same public IP address, according to an example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments for Providing VPN Service to Multiple Tenants Via a Same IP Address A virtual private network (VPN) extends a private network across a public network, such as the Internet. Secure communications may be made over the public network with a VPN through the use of a secure communications protocol such as Hypertext Transfer Protocol Secure (HTTPS). HTTPS is based on the layering of the Hypertext Transfer Protocol (HTTP) on top of the Secure Sockets Layer/Transport Layer Security (SSL/TLS) protocol, thus adding the security capabilities of SSL/TLS to standard HTTP communications.

However, a problem in using SSL with a VPN as a service is that the VPN service provider has to dedicate a separate public IP (Internet Protocol) address for each tenant of the service. This can be expensive, because public IP addresses, specifically in the IPV4 (Internet Protocol version 4) Internet, are a scarce and expensive resource. Furthermore, current VPN gateway solutions are single tenanted, such that each gateway is able to support only a single tenant. In such a scenario, the service provider deploys a separate machine for each tenant. The service provider is not able to use network address translation (NAT) in a device (e.g., a router, etc.) in front of the single tenant gateways because all SSL VPN connections have to come in at the same standard default port for HTTPS (TCP port 443) to the service provider. The SSL VPN connection has to come in on the default VPN port (port 443) to ensure that communications over the connection are able to traverse firewalls, which generally block traffic other than traffic over port 80 (the default TCP port for HTTP) or port 443.

Even where multi-tenanted VPN gateways exist, a single VPN gateway is able to service a finite number of tenants. In reality, service providers deploy multiple such gateways to service many more tenants.

Embodiments described herein enable a service provider to service multiple tenants using a same public IP address. For example, in an embodiment, a client provides a connection string such as a URI to the service provider. A TCP and HTTPS connection may be established between the client and a common SSL proxy server of the service provider, terminating at the proxy server. A decrypted SSTP (Secure Socket Tunneling Protocol) payload is forwarded from the proxy server to the appropriate SSTP server node (e.g., a VPN gateway that uses SSTP as a VPN tunnel traffic protocol), based on a tenant identifier indicated in a received connection string. The tenant identifier is originally inserted in the connection string by the VPN client device according to a VPN client profile.

Note that the service provider may have one or more public IP addresses. Each of those public IP addresses may be configured to service multiple tenants. For example, a first public IP address of the service provider may be used to service a first set of tenants, and a second public IP address of the service provider may be used to service a second set of tenants. Further public IP addresses may be present for the service, each one of them being configured to service a corresponding set of tenants.

Accordingly, embodiments enable tenants to be distinguished based on information in an initial HTTPS payload (the tenant identifier in the received connection string) received by a proxy server, and the connection at the proxy server can be redirected to or re-initiated at another server (e.g., a VPN gateway) that can service the identified tenant. Embodiments enable the tenant identification to be provided from the proxy server to the VPN gateway inside the protocol payload or header, or other location.

VPN services may be configured in various ways to enable the servicing of multiple tenants using a same IP address, in embodiments. For instance, FIG. 1 shows a block diagram of a communications network 100 that includes a service 118 that hosts multiple tenants and enables client devices to access the multiple tenants via a same public IP address, according to an example embodiment. As shown in FIG. 1, communications network 100 includes first and second client devices 102a and 102b and Service 118. Service 118 includes one or more server(s) 104, first application server(s) 106a, and second application server(s) 106b. A first network 108 communicatively couples client devices 102a and 102b with service 118, and a second network 110 internal to service 118 communicatively couples server(s) 104 with application server(s) 106a and application servers 106b. Network 100 is further described as follows.

First and second client devices 102a and 102b may each be any type of stationary or mobile computing device, including a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone (e.g., a cell phone, a smart phone such as a Microsoft Windows® phone, an Apple iPhone, a phone implementing the Google® Android™ operating system, a Palm® device, a Blackberry® device, etc.), a wearable computing device (e.g., a smart watch, a head-mounted device including smart glasses such as Google® Glass™ etc.), or other type of mobile device (e.g., an automobile), or a stationary computing device such as a desktop computer or PC (personal computer). Still further, first and second client devices 102a and 102b may each be a portable media player, a stationary or handheld gaming console, a personal navigation assistant, a camera, or other type of stationary or mobile device. Although two client devices are shown in FIG. 1, in other embodiments, other numbers of client devices may be present in network 100, including tens, hundreds, thousands, and millions of client devices.

Server(s) 104, application server(s) 106a, and application server(s) 106b may each be formed of one or more computing devices that enable communications between devices and/or that are capable of serving information. Server(s) 104 may include any number of individual communication devices (e.g., servers, routers, switches, hubs, bridges, etc.) and servers, including tens, hundreds, and thousands of devices. For example, servers(s) 104 may include one or more routers, proxy servers or other intermediate communication components, gateway servers, and/or further types of servers. Application server(s) 106a and application server(s) 106b may each include any number of individual server devices, including tens, hundreds, and thousands of servers.

Each of client devices 102a and 102b and server(s) 104 may include at least one network interface that enables communications over network 108, and each of server(s) 104, application server(s) 106a, and application server(s) 106b may include one or more network interfaces that enable communications over network 110. Such a network interface may be one or more of any type of network interface (e.g., network interface card (NIC)), wired or wireless, such as an as IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, a near field communication (NFC) interface, etc. Further examples of network interfaces are described elsewhere herein. Examples of network 108 include a local area network (LAN), a wide area network (WAN), a personal area network (PAN), and/or a combination of communication networks, such as the Internet. Examples of network 110 include a local area network (LAN), a wide area network (WAN), or a combination of communication networks.

Client devices 102a, 102b, etc. each include a corresponding client application. For instance, client device 102a includes a client app 128a, and client device 102b includes a client app 128b. Client app 128a is configured to access service 118 for client device 102a, and client app 128b is configured to access service 118 for client device 102b. For example, in an embodiment, when a user of client device 102a desires to access a portion of service 118 (e.g., a tenant), the user may interact with a user interface of client app 128a to initiate a connection with a particular tenant of service 118. Alternatively, client app 128a may act automatically to initiate a connection with a tenant of service 118. Client app 128b of client device 102b may initiate a connection with a tenant of service 118 in a similar manner.

Client apps 128a and 128b may each be a special purpose client application and/or commercially available application that can function as desired. For example, in one embodiment, client app 128a or client app 128b may be a browser, such as Internet Explorer®, developed by Microsoft Corp. of Redmond, Wash., Mozilla Firefox®, developed by Mozilla Corp. of Mountain View, Calif., Safari®, developed by Apple Inc. of Cupertino, Calif., and Google® Chrome of Mountain View, Calif. In another embodiment, client app 128a or client app 128b may be a generic client app, or a client app customized to enable communications with tenants of a VPN service such as service 118.

Application servers at service 118 host (e.g., store and/or execute) tenants. For example, as shown in FIG. 1, application server(s) 106a host(s) a tenant 112a, and application server(s) 106b host(s) a tenant 112b. Each tenant of service 118 contains a virtual network that is isolated from virtual networks of other tenants. Each tenant of service 118 may be accessed through a secure virtual tunnel via a tunneling protocol, such as SSTP, IPsec (Internet Protocol Security), Transport Layer Security (SSL/TLS), Datagram Transport Layer Security (DTLS), Microsoft® Point-to-Point Encryption (MPPE), Multi Path Virtual Private Network (MPVPN), Secure Shell (SSH), etc. Tenants of service 118 may include stored data, applications, virtual machines that execute operating systems that support applications, and/or other information/services. Client devices communicate with the VPNs of tenants to transfer information, including sending and receiving data, to execute applications, and/or to otherwise access information and/or functionality of tenants at service 118.

Figure 2:
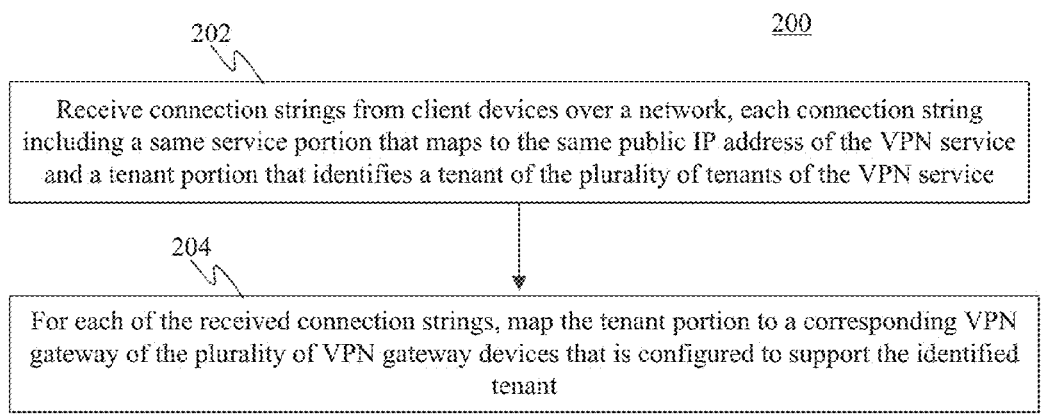
FIG. 2 shows a flowchart providing a process for accessing multiple tenants at a VPN service via a same public IP address, according to an example embodiment.

As described above, embodiments enable a VPN service, such as service 118, to be accessed by client devices, and to provide access to multiple tenants, using a same public IP address for the VPN service. Service 118 may be configured to operate in various ways to provide access to multiple tenants using a same public IP address. For instance, FIG. 2 shows a flowchart 200 providing a process for accessing multiple tenants at a VPN service via a same public IP address, according to an example embodiment. In an embodiment, service 118 may operate according to flowchart 200. Flowchart 200 is described as follows with respect to FIG. 1. Further structural and operational embodiments will be apparent to persons skilled in the relevant art(s) based on the following description.

Flowchart 200 begins with step 202. In step 202, connection strings are received from client devices over a network, each connection string including a same service portion that maps to the same public IP address of the VPN service and a tenant portion that identifies a tenant of the plurality of tenants of the VPN service. For example, in an embodiment, server(s) 104 of service 118 may receive connection strings, such as uniform resource indicators (URI), uniform resource locators (URL), or any other string of connection information, from client devices, such as client devices 102a and 102b, over network 108. Each connection string received from a client device includes a service portion, which maps to the public IP address of service 118 (or to one of the public IP addresses of service 118, when multiple are present). For example, as shown in FIG. 1, server(s) 104 stores and/or has access to an IP address 116. IP address 116 is a public IP address for service 118. For instance, IP address 116 may be a numerical label that enables service 118 to participate (e.g., be identified and found) in network 108 (e.g., the Internet), such as a 32 bit number address (IPV4), or an address having a greater number of bits (e.g., 128 bits in IPV6). IP address 116 may be used by client devices to connect with multiple tenants of service 118.

Each connection string received from a client device also includes a tenant portion, which identifies a tenant of service 118 (e.g., one of tenants 112a, 112b, etc.). An example connection string, which is a URI, is shown as follows for illustrative purposes:

https://vpn.Fabrikam.com/Contoso123

In this example URI, "https" indicates that the secure communications protocol of HTTPS is being used, "vpn.Fabrikam.com" is the service portion (e.g., a domain name), and "Contoso123" is the tenant portion. In this example, "vpn.Fabrikam.com" maps to the public IP address of service 118, and "Contoso123" maps to a particular tenant of service 118 (e.g., tenant 112a).

Referring back to FIG. 2, in step 204, for each of the received connection strings, the tenant portion is mapped to a corresponding VPN gateway of the plurality of VPN gateway devices that is configured to support the identified tenant. For example, in an embodiment, server(s) 104 may include a tenant mapper 114. Tenant mapper 114 is configured to map the tenant portion of a received connection string to a VPN gateway of server(s) 104. The mapped VPN gateway is configured to support the tenant that is identifiable by the tenant portion. For instance, tenant mapper 114 may store and/or have access to a tenant map. The tenant map is a data structure (e.g., a list, a file, a database, an array, etc.) that includes a plurality of tenant portions (e.g., alphanumerical strings that may be received appended to a domain name in a URI) that identify a corresponding tenant, and for each tenant portion of the tenant map, the tenant map indicates a corresponding gateway of a plurality of gateways of server(s) 104. The corresponding gateway of the plurality of gateways is the gateway that is configured to support communications by client devices with the tenant at an application server. Based on the mapping, the gateway is instructed to enable the VPN tunnel to be formed between the identified tenant and the client device having provided the connection string.

For instance, the gateway may function as an intermediary device between the client device and the application server of the tenant, and may receive and forward communications (e.g., packets) between them. With reference to FIG. 1, the gateway device in server(s) 104 may communicate with the tenant (e.g., tenant 112a) at the corresponding application server (e.g., application server(s) 106a) through network 110. In an example, a VPN tunnel may be formed between application server(s) 106a and client app 128a at client device 102a through server(s) 104 (which includes the VPN gateway indicated by the mapping).

For instance, FIG. 1 shows a VPN tunnel 122 established between tenant 112a and client device 102a through service 118 and network 108, based on a URI 120 transmitted by client app 128a. Furthermore, FIG. 1 shows a VPN tunnel 126 established between tenant 112b and client device 102b through service 118 and network 108, based on a URI 124 transmitted by client app 128b. URIs 120 and 124 include a same service portion, which maps to service 118, and different tenant portions, which map to tenant 112a and tenant 112b, respectively.

Service 118 may be configured to operate in various ways and may have various structures to perform its functions, in embodiments. Service 118 may be any online service that provides services with regards to multiple tenants. Examples of service 188 include a VPN (virtual private network) service, an online desktop, a database service, an application productivity suite (e.g., Microsoft® Office 365™, etc.), or other type of online service or application. The following subsections describe exemplary embodiments for the operation of service 118 and of structures for service 118, and disclose further embodiments for enabling a VPN service to service multiple tenants using a same IP address.

Figure 3:
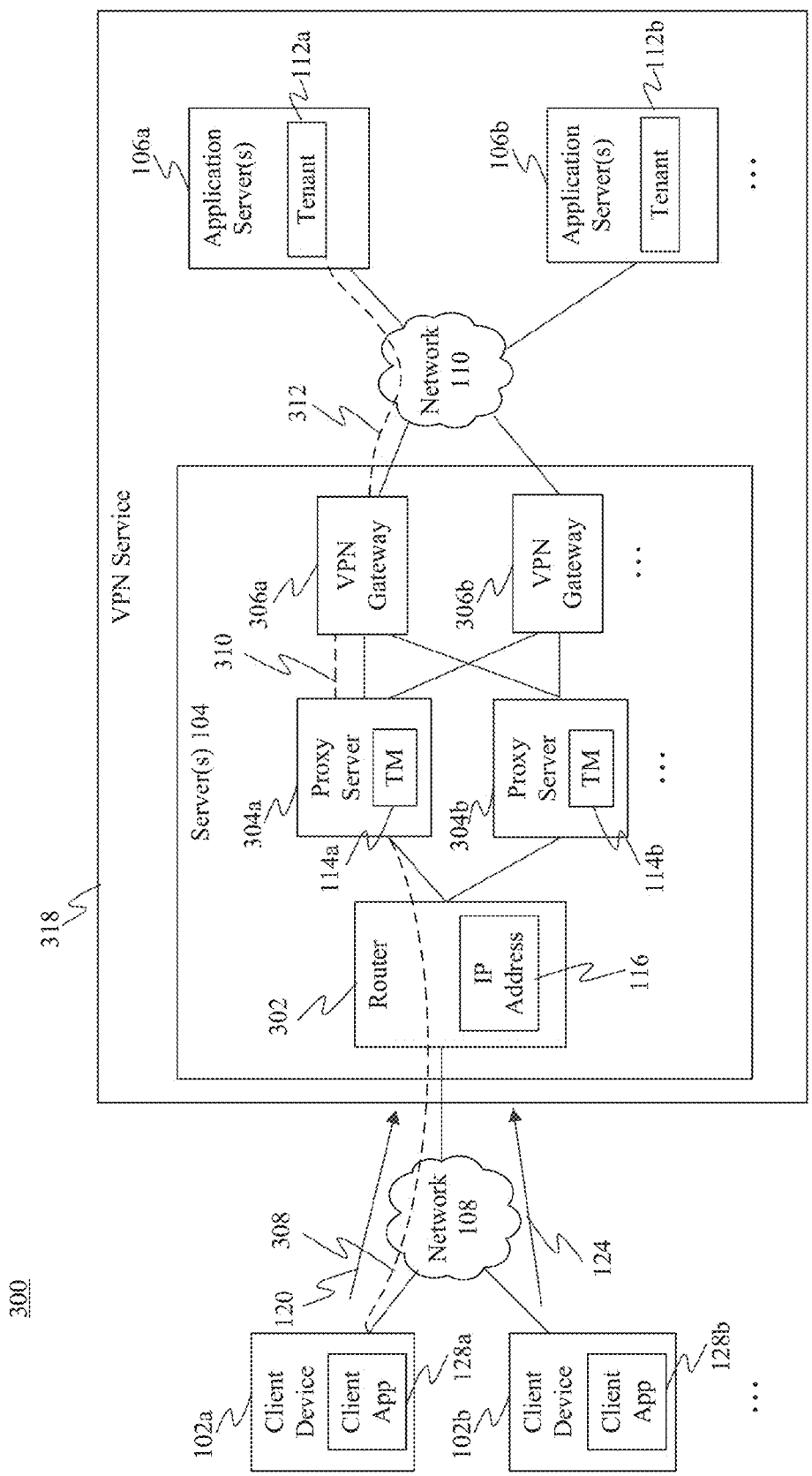
FIG. 3 shows a block diagram of the communications network of FIG. 1, with the VPN service including a router, proxy servers, and VPN gateways, according to an example embodiment.

A. Example Embodiments for a VPN Service Configured to Service Multiple Tenants Using a Same IP Address In embodiments, a VPN service may be configured in various ways to service multiple tenants using a same IP address. For instance, FIG. 3 shows a block diagram of a communications network 300 that includes a VPN service 318, according to an example embodiment. Communication network 300 is an example of communication network 100 of FIG. 1. As shown in FIG. 3, communication network 300 includes first and second client devices 102a and 102b and VPN service 318. VPN service 318 is an example of service 118 of FIG. 1. Although described as a VPN service, in other embodiments, VPN service 318 may be another type of online service (e.g., a database service, etc.) VPN service 318 includes one or more server(s) 104, first application server(s) 106a, and second application server(s) 106b. First network 108 communicatively couples client devices 102a and 102b with VPN service 318, and second network 110 communicatively couples server(s) 104 with application server(s) 106a and application servers 106b. Furthermore, in the example of FIG. 3, server(s) 104 includes a router 302, a first proxy server 304a, a second proxy server 304b, a first VPN gateway 306a and a second VPN gateway 306b. Features of network 300 (other than those already described above with respect to FIG. 1) are described as follows.

Router 302 is optionally present. As shown in FIG. 3, router 302 interfaces server(s) 104 with first network 108. As such, router 302 may be referred to as a network-facing (e.g., an Internet-facing) router or server, and also may be referred to as a load balancer (LB). Router 302 is configured to receive communication traffic (e.g., packets) from client devices through network 108, and route the communication traffic to proxy servers 304a, 304b, etc. Furthermore, router 302 is configured to route the communication traffic received from proxy servers 304a, 304b, etc. to client devices over network 108. Router 302 may include network address translation (NAT) functionality, such that router 302 can remap between IP address spaces. For instance, router 302 may be configured to map addresses between network 108 (e.g., the Internet) and a network(s) of VPN service 318. Furthermore, router 302 may include server load balancing (SLB) functionality, such that router 302 is capable of balancing/distributing workloads across proxy servers 304a, 304b, and any additional proxy servers.

Note that in an embodiment, one or more additional routers 302 may be present to balance connections between client devices and proxy servers. Each router may include a same or different policy for this purpose. When additional routers 302 are present (e.g., a pool of LB devices), there may be a router positioned between the routers and network 108 that uses equal-cost multi-path routing (ECMP) or other load balancing algorithm to distribute communication flows.

Alternatively, the functionality of router 302 of FIG. 3 may be included in proxy servers 304a, 304b, etc., and in such case, router 302 may not be present. Instead, proxy servers 304a, 304b, etc. may include a network interface to interface with network 108 directly.

Proxy servers 304a, 304b, etc., are configured to act as intermediaries for requests from clients seeking resources (e.g., access to tenants of VPN service 318). Proxy servers 304a, 304b, etc. map incoming connection strings (e.g., URIs) from client devices 102a, 102b, etc. to VPN gateways 306a, 306b, etc., so that the VPN gateways can configure VPN tunnels between the client devices and tenants at application server(s) 106a, 106b, etc. When router 302 is present, router 302 may select a particular one of the proxy servers to handle a particular received connection string. Router 302 may communicate with the selected proxy server through a network, a direction connection, or other communication medium of VPN service 318. When router 302 is not present, proxy server 304a, 304b, etc., may decide amongst themselves, in any manner, which proxy server is to handle a particular received connection string. Any number of proxy server devices may be present, including tens, hundreds, and thousands of proxy servers. Each proxy server is configured to set up a connection with a client device using a secure communications protocol (e.g., HTTPS, etc.) in response to receiving a connection string from the client device. The proxy server determines the VPN gateway configured to service the tenant associated with the connection string, and forms a connection with the VPN gateway so that a VPN tunnel may be configured for the tenant between the VPN gateway and client device.

As shown in FIG. 3, each of proxy servers 304*a*, 304*b*, etc., may include a corresponding one of tenant mappers (TM) 114*a*, 114*b*, etc. As described above for tenant mapper 114 in FIG. 1, tenant mappers 114*a*, 114*b* are each configured to map the tenant portion of a received connection string to one of VPN gateways 306*a*, 306*b*, etc. that is configured to support the tenant. For instance, each tenant mapper 114*a*, 114*b*, etc. may store and/or have access to their own tenant map, or a common tenant map shared between them. As described above, the tenant map is a data structure maps each tenant portion of a connection string, which identifies a tenant, to a corresponding VPN gateway. As such, a tenant mapper may perform a look up of the tenant map, using the tenant portion of a received connection string to determine the particular VPN gateway configured to service the tenant. Each of proxy servers 304*a*, 304*b*, etc., is configured to communicate with VPN gateways 306*a*, 306*b*, etc. Communications between proxy servers and VPN gateways may be performed over a common network in VPN service 318, through direct communication links, and/ or in other ways. In this manner, a proxy server can communicate with an identified VPN gateway, such as by setting up a connection with the identified VPN gateway (e.g., an HTTP connection, etc.), to inform the VPN gateway to set up a VPN tunnel between the identified tenant and the client device.

Note that proxy servers 304*a*, 304*b*, etc., are each a type of intermediate communications service or component configured to perform the functions described herein for proxy servers, including mapping tenant portions, and in alternative embodiments, other types of intermediate communications services or components may be present. An intermediate communications service/component may be a separate physical hardware device, or may be incorporated in one of the other devices of FIG. 3 in server(s) 104.

VPN gateways 306*a*, 306*b*, etc. are configured to set up VPN tunnels between client devices 102*a*, 102*b*, etc. and tenants 112*a*, 112*b*, etc. at application server(s) 106*a*, 106*b*, etc. A VPN gateway may receive a communication from a proxy server (e.g., via an HTTP or other connection) that identifies a tenant that the VPN gateway supports and identifies a client device that provided the connection string. In response, the VPN gateway is configured to set up a VPN tunnel between the identified tenant and the identified client device. As shown in FIG. 3, VPN gateways 306*a*, 306*b*, etc., are communicatively interfaced with application server(s) 106*a*, 106*b*, etc. through network 110. As such, each of VPN gateways 306*a*, 306*b*, etc. may be capable of communicating with each of application server(s) 106*a*, 106*b*, etc., or may be capable of communicating only with particular application servers that host tenants that the VPN gateway is configured to support. VPN gateways 306*a*, 306*b*, etc. may include any number of gateway devices, including tens, hundreds, and thousands of gateways.

Figure 4:
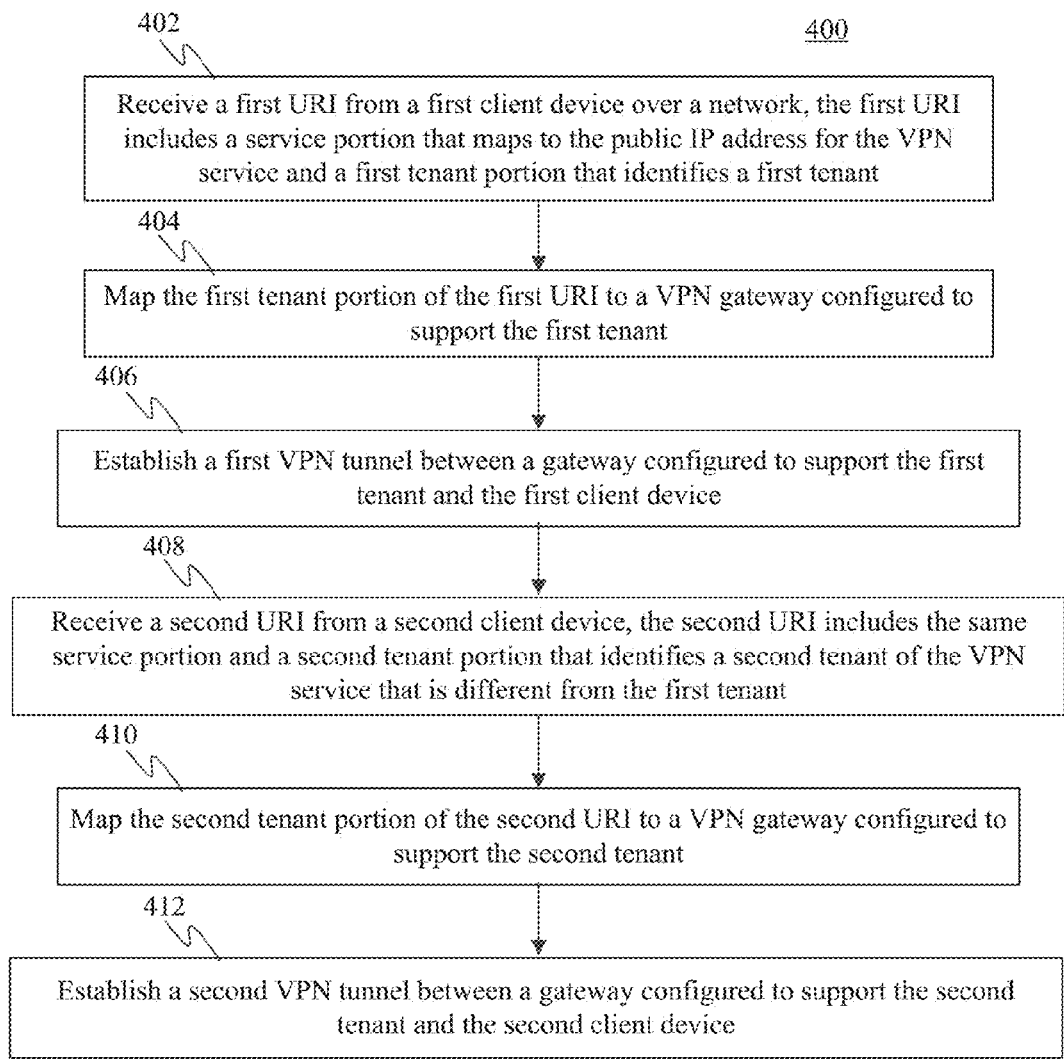
FIG. 4 shows a flowchart providing a process for first and second client devices to access different tenants at a VPN service via a same public IP address, according to an example embodiment.

In an embodiment, VPN service 318 may be configured service multiple tenants using a same public IP address (note that in an embodiment, VPN service 318 may have multiple public IP addresses, and each of the public IP addresses may service multiple tenants). For instance, FIG. 4 shows a flowchart 400 providing a process for first and second client devices to access different tenants at a VPN service via a same public IP address, according to an example embodiment. In an embodiment, VPN service 318 may operate according to flowchart 400. In the example of flowchart 400, URIs are used as connection strings for illustrative purposes. Flowchart 400 is described as follows with respect to FIG. 3. Further structural and operational embodiments will be apparent to persons skilled in the relevant art(s) based on the following description.

Flowchart 400 of FIG. 4 begins with step 402. In step 402, a first URI is received from a first client device over a network, the first URI includes a service portion that maps to the public IP address for the VPN service and a first tenant portion that identifies a first tenant. For instance, as shown in FIG. 3, a first URI 120 may be received by VPN service 318 from client device 102*a*. First URI 120 may be entered by a user to client app 128*a*, or generated by client app 128*a*. Client app 128*a* transmits URI 120 over network 108 to router 302 in a request according to a secure communications protocol, such as HTTPS. The service portion of URI 120 (e.g., a domain name) identifies router 302 as the network interface for VPN service 318. URI 120 also includes a tenant portion, which identifies a tenant of VPN service 318 (e.g., one of tenants 112*a*, 112*b*, etc.).

In step 404, the first tenant portion of the first URI is mapped to a VPN gateway configured to support the first tenant. In an embodiment, router 302 (when present) routes URI 120 to one of proxy servers 304*a*, 304*b*, etc., such as proxy server 304*a* in the example of FIG. 3. Proxy server 304*a* receives URI 120 from router 302, and tenant mapper 114*a* of proxy server 304*a* maps the tenant portion to a gateway of VPN gateways 306*a*, 306*b*, etc., such as VPN gateway 306*a*.

In step 406, a first VPN tunnel is established between a gateway configured to support the first tenant and the first client device. In an embodiment, VPN gateway 306*a* receives a communication from proxy server 304*a*, which identifies the tenant targeted by URI 120, or provides the tenant portion to VPN gateway 306*a* so that VPN gateway 306*a* can use the tenant portion to identify the tenant. For example, the tenant may be tenant 112*a* in the example of FIG. 3. VPN gateway 306*a* establishes a VPN tunnel between VPN gateway 306*a* and client device 102*a* to enable communications between application server(s) 106*a*, which hosts tenant 112*a*, and client device 102*a*. For example, FIG. 1 shows a VPN tunnel 122 established between tenant 112*a* and client device 102*a* through VPN service 318 and network 108 based on URI 120.

In step 408, a second URI is received from a second client device, the second URI includes the same service portion and a second tenant portion that identifies a second tenant of the VPN service that is different from the first tenant. For instance, as shown in FIG. 3, a second URI 124 may be received by VPN service 318 from client device 102*b*. Second URI 124 may be entered by a user to client app 128*b*, or generated by client app 128*b*. Client app 128*b* transmits URI 124 over network 108 to router 302 in a request according to a secure communications protocol, such as HTTPS. The service portion of URI 124 (e.g., a domain name) identifies router 302 as the network interface for VPN service 318. URI 124 also includes a tenant portion, which identifies a tenant of VPN service 318 (e.g., one of tenants 112*a*, 112*b*, etc.).

In the example of FIG. 3, the service portions of URIs 120 and 124 are the same (mapping to the public IP address of VPN service 318, while the tenant portions are different (identifying different tenants of VPN service 318).

In step 410, the second tenant portion of the second URI is mapped to a VPN gateway configured to support the second tenant. In an embodiment, router 302 (when present) routes URI 124 to one of proxy servers 304a, 304b, etc., such as proxy server 304b in the example of FIG. 3. In another example, URI 124 may be routed to the same proxy server as URI 120 (e.g., proxy server 304a). Proxy server 304b receives URI 124 from router 302, and tenant mapper 114b of proxy server 304b maps the tenant portion to a gateway of VPN gateways 306a, 306b, etc., such as VPN gateway 306b in the example of FIG. 3. In another example, the tenant portion of URI 124 may have mapped to the same VPN gateway as the tenant portion of URI 120 (e.g., VPN gateway 306a), which may have supported both of the tenants.

In step 412, a second VPN tunnel is established between a gateway configured to support the second tenant and the second client device. In an embodiment, VPN gateway 306b receives a communication from proxy server 304b, which identifies the tenant targeted by URI 124, or provides the tenant portion to VPN gateway 306b so that VPN gateway 306b can use the tenant portion to identify the tenant. For example, the tenant may be tenant 112b in the example of FIG. 3. VPN gateway 306b establishes a VPN tunnel between itself and client device 102b to enable communications between application server(s) 106b, which host tenant 112b, and client device 102b. For example, FIG. 1 shows a VPN tunnel 126 established between tenant 112b and client device 102b through VPN service 318 and network 108 based on URI 124. Note that URIs 120 and 124 include a same service portion, which maps to service 118, and different tenant portions, which map to tenant 112a and tenant 112b, respectively. As such, tenant mappers 114a and 114b enable service 118 to receive tenant requests for multiple tenants according to a same public IP address for service 118.

Figure 5:
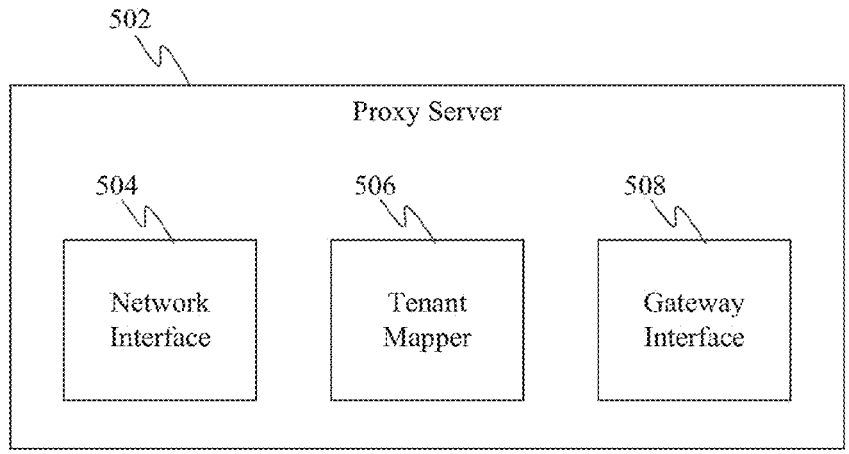
FIG. 5 shows a block diagram of a proxy server, according to an example embodiment.

Note that the servers of server(s) 104 of VPN service 318 may be configured in various ways to perform their functions. For instance, FIG. 5 shows a block diagram of a proxy server 502, according to an example embodiment. Proxy server 502 is an example of one of proxy servers 304a, 304b, etc. Note that proxy server 502 (as well as proxy servers 304a and 304b) may alternatively be referred to as an "HTTPS" proxy (when configured for HTTPS as a secure communications protocol), an "HTTPS" server, or otherwise. Proxy server 502 may be configured as a web server, such as being configured according to Internet Information Services (IIS) or other web server that may support a variety of types of communication protocols, such as HTTP, HTTPS, FTP (file transfer protocol), FTPS (FTP secure), Simple Mail Transfer Protocol (SMTP), and Network News Transfer Protocol (NNTP).

As shown in FIG. 5, proxy server 502 includes a network interface 504, a tenant mapper 506, and a gateway interface 508. Network interface 504 is a communications interface for proxy server 502 to communicate with router 302 (FIG. 3) (when present), or directly with client devices 102a, 102b, etc. As such, network interface 504 receives connection strings such as URIs, and may facilitate traffic flow (e.g., packets) between a client device and a tenant as part of an established VPN tunnel. Network interface 504 may be configured to communicate according to various protocols, such as TCP, HTTPS, SSTP, other communication protocols disclosed herein, and/or other known communication protocols. Accordingly, network interface 504 may perform step 202 of FIG. 2, step 402 of FIG. 4, and/or step 408 of FIG. 4.

Tenant mapper 506 is an example of tenant mapper 114 (FIG. 1) or tenant mappers 114a and 114b (FIG. 3). As such, tenant mapper 506 is configured to map the tenant portion of a received connection string to a VPN gateway that is configured to support the tenant identified by the tenant portion. Accordingly, tenant mapper 506 may perform step 204 of FIG. 2, step 404 of FIG. 4, and/or step 410 of FIG. 4.

Gateway interface 508 is a communications interface for proxy server 502 to communicate with VPN gateways 306a, 306b, etc. (FIG. 3). As such, gateway interface 506 may be used to provide tenant information to a VPN gateway, and may facilitate traffic flow (e.g., packets) between a client device and a tenant as part of an established VPN tunnel. Gateway interface 506 may be configured to communicate according to various protocols, such as TCP, HTTPS, HTTP, SSTP, other communication protocols disclosed herein, and/or other known communication protocols. Accordingly, gateway interface 506 may enable step 406 of FIG. 4, and/or step 412 of FIG. 4 to be performed.

Note that in an embodiment, functionality of VPN gateways 306a, 306b, etc. may be integrated in proxy servers 304a, 304b, etc. In such an embodiment, VPN gateways 360a, 306b, etc., may not be present, and proxy servers 304a, 304b, may communicate directly with application server(s) 106a, 106b, etc. through network 110. In such an embodiment, gateway interface 506 may instead be an application server interface.

Figure 6:
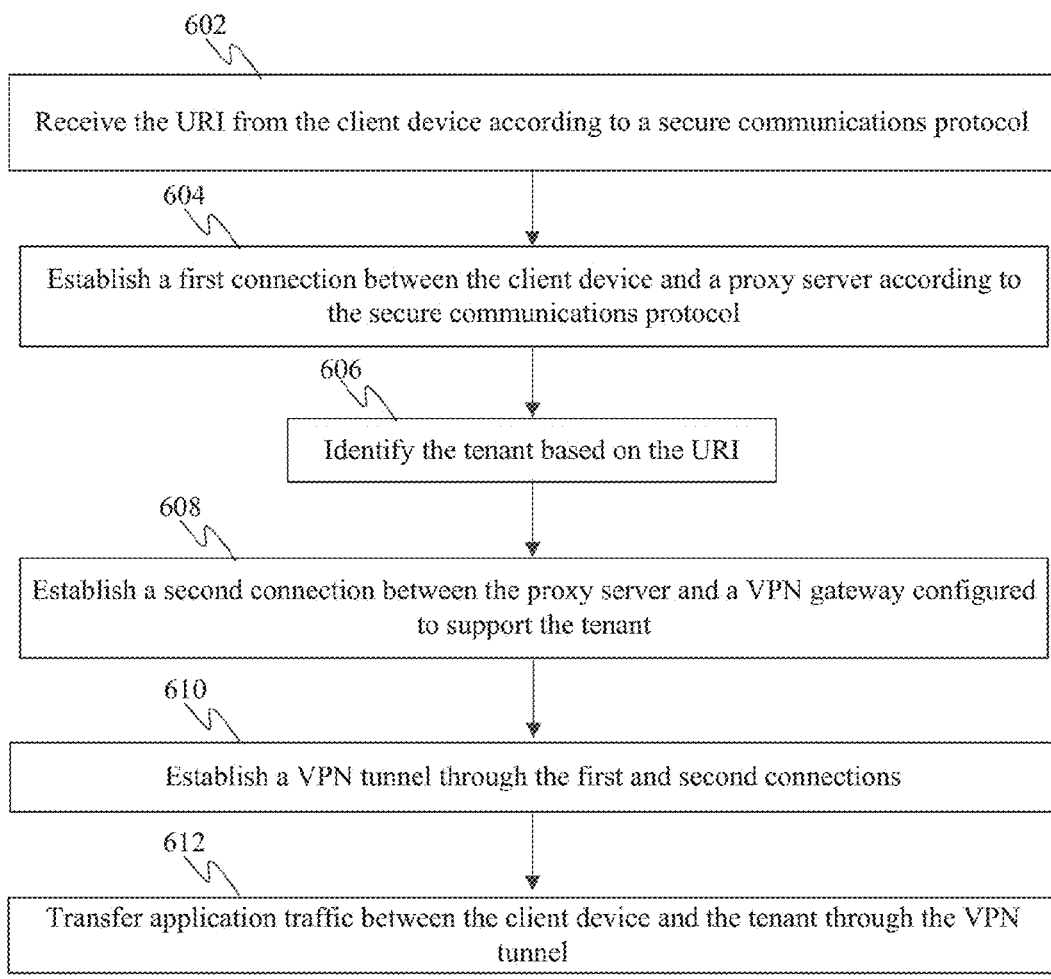
FIG. 6 shows a flowchart providing a process for establishing a VPN tunnel between a client device and a tenant at an application server in response to a connection string that identifies the tenant received from the client device, according to an example embodiment.

B. Example Communications for a VPN Service to Generate a VPN Tunnel to Enable Application Traffic Between Clients and Tenants A VPN service disclosed herein may communicate in any manner, and according to any suitable communication protocols, to establish VPN tunnels between clients and tenants. For example, FIG. 6 shows a flowchart 600 providing a process for establishing a VPN tunnel between a client device and a tenant at an application server in response to a connection string that identifies the tenant received from the client device, according to an example embodiment. In an embodiment, flowchart 600 may be performed by a VPN service, such as service 118 of FIG. 1, or VPN service 318 of FIG. 3. Flowchart 600 may be performed for each received connection string, and is an example embodiment for implementing steps 402, 404, and 406 of FIG. 4, as well as implementing steps 408, 410, and 412 of FIG. 4. Flowchart 600 is described as follows with respect to FIG. 3 for illustrative purposes. In the example of flowchart 600, a URI is used as connection string for illustrative purposes. Further structural and operational embodiments will be apparent to persons skilled in the relevant arts) based on the following description.

Flowchart 600 of FIG. 6 begins with step 602. In step 602, the URI is received from the client device according to a secure communications protocol. For instance, as shown in FIG. 3, a first URI 120 may be received by VPN service 318 from client device 102a. For example, client app 128a of client device 102a may transmit URI 120 over network 108 in a request according to a secure communications protocol, such as HTTPS. Due to the service portion of URI 120 mapping to the public IP address for VPN service 318, URI 120 is transmitted through network 108 to router 302.

In step 604, a first connection is established between the client device and a proxy server according to the secure communications protocol. In an embodiment, a first connection 308 may be established in response to receiving URI 120. Connection 308 is established between client device 102a and proxy server 304a, which is the proxy server selected by router 302 to handle URI 120 in the current example. Connection 308 may be established according to the secure communication protocol of URI 120, such as HTTPS.

Figure 7:
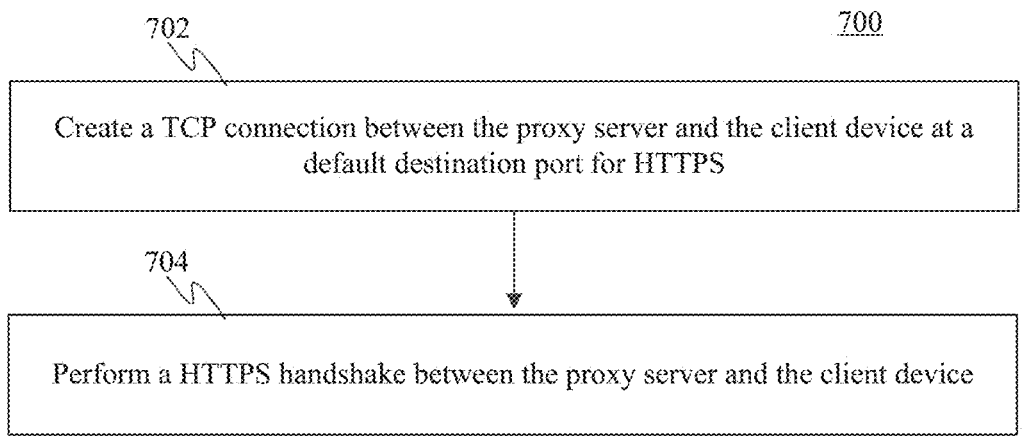
FIG. 7 shows a flowchart providing a process for establishing a connection between a client device and a proxy server according to a secure communications protocol, according to an example embodiment.

Step 604 may be performed in various ways. For instance, FIG. 7 shows a flowchart 700 providing a process for establishing a connection between a client device and a proxy server according to a secure communications protocol, according to an example embodiment. In an embodiment, step 604 may be performed according to step 604. Flowchart 700 is described as follows.

In step 702, a TCP connection is created between the proxy server and the client device at a default destination port for HTTPS. For example, in an embodiment, in response to receiving URI 120 according to HTTPS, proxy server 304a may create a TCP connection with client app 128a at client device 102a. HTTPS has a default port of 443, and therefore, the TCP connection may be created at destination port 443 at proxy server 304a. Accordingly, first connection 308 may include a TCP connection.

In step 704, a HTTPS handshake is performed between the proxy server and the client device. In an embodiment, where HTTPS is the secure communications protocol, a HTTPS handshake may be performed between client app 128a and proxy server 304a to establish the HTTPS connection over first connection 308. This may include performing authentication, agreeing on encryption according to an encryption layer of SSL/TLS (perform a SSL/TLS handshake over the TCP connection) to protect data traffic, an HTTPS request may be sent from the client to the proxy server and a response sent from the proxy server to the client (e.g., with status HTTP_STATUS_OK(200)) (referred to as "HTTPS request-response"), etc. Accordingly, in an embodiment, traffic may flow through first connection 308 between client app 128a and proxy server 304a according to HTTPS.

Referring back to FIG. 6, in step 606, the tenant is identified based on the URI. In an embodiment, proxy server 304a receives URI 120 from router 302, and tenant mapper 114a of proxy server 304a maps the tenant portion to a gateway of VPN gateways 306a, 306b, etc., such as VPN gateway 306a.

In step 608, a second connection is established between the proxy server and a VPN gateway configured to support the tenant. In an embodiment, a second connection 310 may be established in response to proxy server 304a receiving URI 120 and identifying VPN gateway 306a according to the tenant portion of URI 120. Connection 310 is established between proxy server 304a and VPN gateway 306a in the current example. Connection 310 may be established according to the secure communication protocol of URI 120, such as HTTPS, or according to a non-secure communication protocol, such as HTTP. In embodiments, the secure communications may be performed according to a stack comprising at least one of SSTP (Secure Socket Tunneling Protocol), Hypertext Transfer Protocol Secure (HTTPS), Transmission Control Protocol (TCP), Internet Protocol (IP), or Point to Point Protocol (PPP). For instance, first connection 308 may implement communications according to one or more of SSTP, HTTPS, TCP, or IP, and second connection 310 may implement communications according to one or more of SSTP HTTP, TCP, IP, or PPP.

Figure 8:
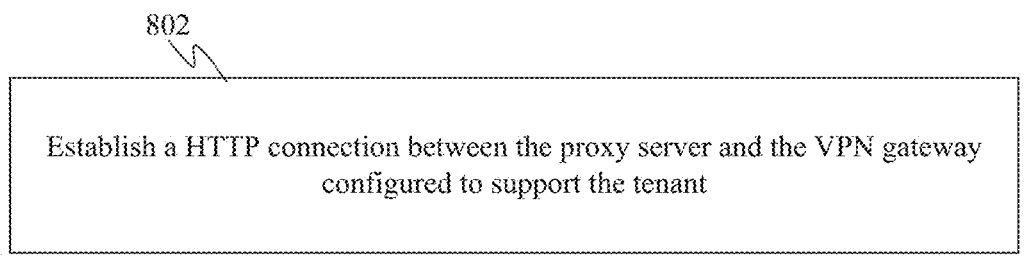
FIG. 8 shows a process for establishing a connection between a proxy server and a VPN gateway, according to an example embodiment.

For example, in an embodiment, step 608 may be performed according to FIG. 8. FIG. 8 shows a step 802 for establishing a connection between a proxy server and a VPN gateway, according to an example embodiment. In step 802, a HTTP connection is established between the proxy server and the VPN gateway configured to support the tenant. This may include establishing a TCP connection between proxy server 304a and VPN gateway 306a using the default port server 80, authentication, etc., and an HTTP handshake may be performed. As such, in an embodiment, second connection 310 may be established as an HTTP connection between proxy server 304a and VPN gateway 306a. Proxy server 304a may pass identifying information for the identified tenant of URI 120 to VPN gateway 306a through second connection 310, and traffic may flow through second connection 310 between proxy server 304a and VPN gateway 306a according to HTTP.

In step 610, a VPN tunnel is established through the first and second connections. As described above, VPN gateway 306a receives a communication from proxy server 304a that enables the tenant targeted by URI 120 to be identified. For example, the tenant may be tenant 112a in the example of FIG. 3. VPN gateway 306a establishes a VPN tunnel between VPN gateway 306a and client device 102a to enable communications between application server(s) 106a, which host tenant 112a, and client device 102a. For example, VPN tunnel 122 of FIG. 1 may be established between tenant 112a and client device 102a through first and second connections 308 and 310 shown in FIG. 3.

Figure 9:
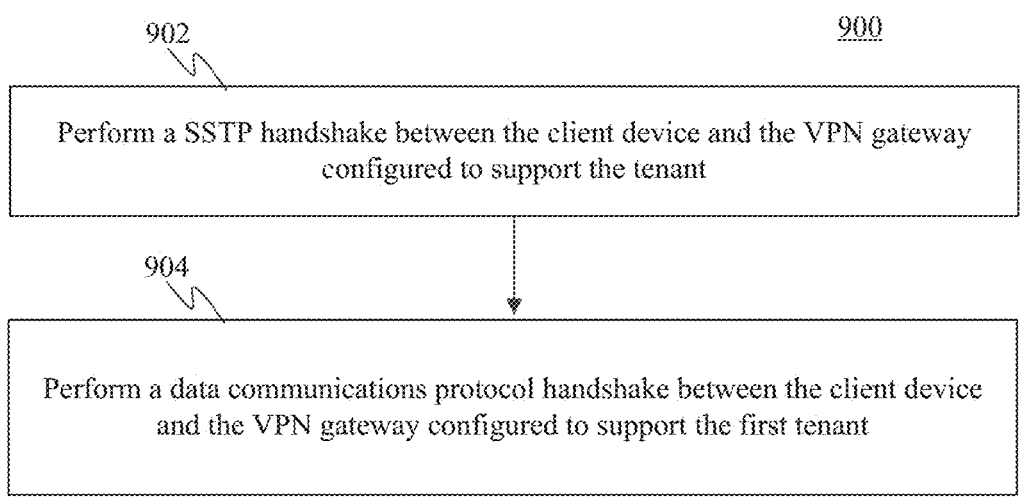
FIG. 9 shows a flowchart providing a process for establishing a VPN tunnel between a client device and a VPN gateway, according to an example embodiment.

In embodiments, VPN tunnel 122 (FIG. 1) may be formed through first and second connections 308 and 310 shown in FIG. 3 according to any suitable VPN tunnel protocol mentioned elsewhere herein or otherwise known, in any manner. For instance, FIG. 9 shows a flowchart 900 providing a process for establishing a VPN tunnel between a client device and a VPN gateway, according to an example embodiment. In an embodiment, step 610 may be performed according to flowchart 900. Flowchart 900 is described as follows.

In step 902, a SSTP handshake is performed between the client device and the VPN gateway configured to support the tenant. In this example, SSTP is the VPN tunnel protocol used to illustrate establishing of a VPN tunnel, although embodiments are not limited to SSTP. SSTP provides an encrypted tunnel according to the SSL/TLS (Secure Sockets Layer/Transport Layer Security) protocol. SSTP provides a mechanism to transport PPP (Point-to-Point Protocol) or L2TP (Layer 2 Tunneling Protocol) traffic (or other type of data communications protocol) over the SSL channel of the HTTPS protocol. When a client tries to establish a SSTP-based VPN connection, SSTP first establishes a bidirectional HTTPS layer between the client device and the proxy server (e.g., see step 604 of FIG. 6 described above). Over this HTTPS layer, an SSTP handshake may be performed to enable communications to be made over the VPN tunnel using SSTP. The SSTP handshake may involve the VPN gateway communicating with the client device to determine authentication and/or other procedures performed during an SSTP handshake.

In step 904, a data communications protocol handshake is performed between the client device and the VPN gateway configured to support the first tenant. In this example, PPP is the data link protocol/data communications protocol used to establish a direct connection between client device 102a and VPN gateway 306a, although embodiments are not limited to PPP. For instance, other data communications protocols of one or more layers may be used instead or in addition to PPP. The PPP (or other) handshake may involve authentication and/or other procedures performed during a PPP handshake.

Referring back to FIG. 6, in step 612, application traffic is transferred between the client device and the tenant through the VPN tunnel. In an embodiment, after VPN tunnel 122 (FIG. 1) is established between client app 128a and VPN gateway 306a, application traffic may flow between tenant 112a at application server(s) 106a and client app 128a through VPN gateway 306a. The application traffic flows through first connection 308 (encrypted according to SSL/TLS, when first connection 308 is an HTTPS connection), second connection 310 (e.g., according to HTTP), and through network 110 between VPN gateway 306a and application server(s) 106a, in either direction. In the embodiment of flowchart 900 (FIG. 9), SSTP protocol packets flow through a VPN tunnel as the HTTPS payload. SSTP encapsulates PPP data frames in IP datagrams for transmission over network 108.

In this description of flowchart 600, proxy server 304a, VPN gateway 306a, and tenant 112a at application server(s) 106a were used as examples for the purposes of illustration, but in embodiments, any combination of proxy server, VPN gateway, and application server may be used. In a similar manner, with regard to URI 124 transmitted by client app 128b, a first connection may be established between client app 128b and one of proxy servers 304a, 304b, etc., a second connection may be established between the one of proxy servers 304a, 304b, etc. and one of VPN gateways 306a, 306b, etc. (configured to support the target tenant), and the tenant portion of URI 124 may be mapped to any tenant of application server(s) 106a, 106b, etc. Accordingly, a VPN tunnel may be established between the proxy server and VPN gateway to transfer traffic between the tenant and client app.

III. Example Mobile and Stationary Device Embodiments

Client devices 102a and 102b, server(s) 104, application server(s) 106a and 106b, tenants 112a and 112b, tenant mapper 114, service 118, client apps 128a and 128b, router 302, proxy servers 304a and 304b, VPN gateways 306a and 306b, VPN service 318, proxy server 502, network interface 504, tenant mapper 506, gateway interface 508, flowchart 200, flowchart 400, flowchart 600, flowchart 700, step 802, and flowchart 900 may be implemented in hardware, or hardware combined with software and/or firmware. For example, tenants 112a and 112b, tenant mapper 114, service 118, client apps 128a and 128b, VPN service 318, tenant mapper 506, flowchart 200, flowchart 400, flowchart 600, flowchart 700, step 802, and/or flowchart 900 may be implemented as computer program code/instructions configured to be executed in one or more processors and stored in a computer readable storage medium. Alternatively, client devices 102a and 102b, server(s) 104, application server(s) 106a and 106b, tenants 112a and 112b, tenant mapper 114, service 118, client apps 128a and 128b, router 302, proxy servers 304a and 304b, VPN gateways 306a and 306b, VPN service 318, proxy server 502, network interface 504, tenant mapper 506, gateway interface 508, flowchart 200, flowchart 400, flowchart 600, flowchart 700, step 802, and/or flowchart 900 may be implemented as hardware logic/electrical circuitry.

For instance, in an embodiment, one or more, in any combination, of tenants 112a and 112b, tenant mapper 114, service 118, VPN service 318, tenant mapper 506, flowchart 200, flowchart 400, flowchart 600, flowchart 700, step 802, and/or flowchart 900 may be implemented together in a SoC. The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 10:
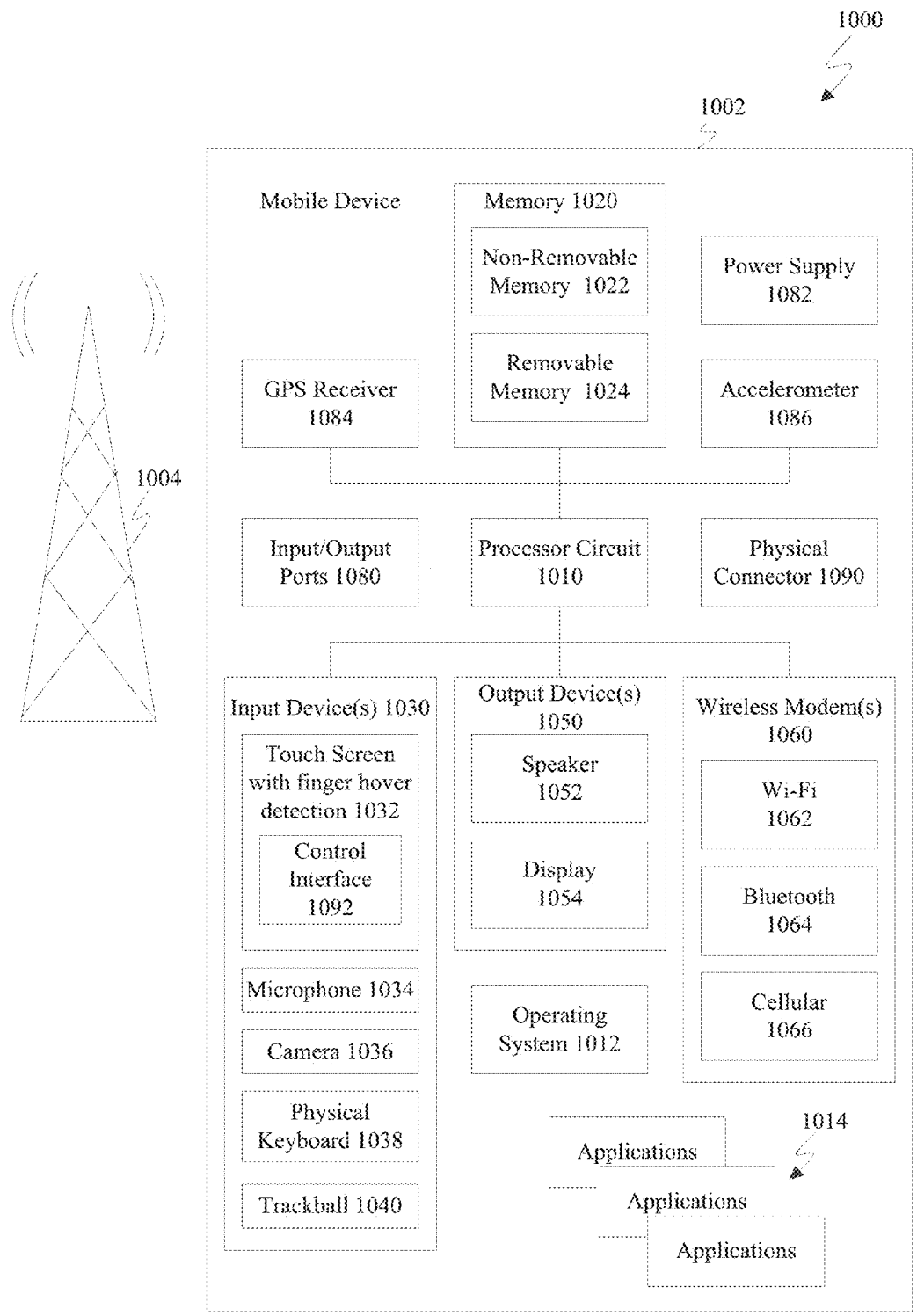
FIG. 10 shows a block diagram of an exemplary user device in which embodiments may be implemented.

FIG. 10 shows a block diagram of an exemplary mobile device 1000 including a variety of optional hardware and software components, shown generally as components 1002. For instance, components 1002 of mobile device 1000 are examples of components that may be included in client devices 102a and 102b (FIG. 1) in mobile device embodiments. Any number and combination of the features/elements of components 1002 may be included in a mobile device embodiment, as well as additional and/or alternative features/elements, as would be known to persons skilled in the relevant art(s). It is noted that any of components 1002 can communicate with any other of components 1002, although not all connections are shown, for ease of illustration. Mobile device 1000 can be any of a variety of mobile devices described or mentioned elsewhere herein or otherwise known (e.g., cell phone, smartphone, handheld computer, Personal Digital Assistant (PDA), etc.) and can allow wireless two-way communications with one or more mobile devices over one or more communications networks 1004, such as a cellular or satellite network, or with a local area or wide area network.

The illustrated mobile device 1000 can include a controller or processor referred to as processor circuit 1010 for performing such tasks as signal coding, image processing, data processing, input/output processing, power control, and/or other functions. Processor circuit 1010 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1010 may execute program code stored in a computer readable medium, such as program code of one or more applications 1014, operating system 1012, any program code stored in memory 1020, etc. Operating system 1012 can control the allocation and usage of the components 1002 and support for one or more application programs 1014 (a.k.a. applications, "apps", etc.). Application programs 1014 can include common mobile computing applications (e.g., email applications, calendars, contact managers, web browsers, messaging applications) and any other computing applications (e.g., word processing applications, mapping applications, media player applications).

As illustrated, mobile device 1000 can include memory 1020. Memory 1020 can include non-removable memory 1022 and/or removable memory 1024. The non-removable memory 1022 can include RAM, ROM, flash memory, a hard disk, or other well-known memory storage technologies. The removable memory 1024 can include flash memory or a Subscriber Identity Module (SIM) card, which is well known in GSM communication systems, or other well-known memory storage technologies, such as "smart cards." The memory 1020 can be used for storing data and/or code for running the operating system 1012 and the applications 1014. Example data can include web pages, text, images, sound files, video data, or other data sets to be sent to and/or received from one or more network servers or other devices via one or more wired or wireless networks. Memory 1020 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

A number of programs may be stored in memory 1020. These programs include operating system 1012, one or more application programs 1014, and other program modules and program data. Examples of such application programs or program modules may include, for example, computer program logic (e.g., computer program code or instructions) for implementing tenants 112*a* and 112*b*, tenant mapper 114, service 118, client apps 128*a* and 128*b*, VPN service 318, tenant mapper 506, flowchart 200, flowchart 400, flowchart 600, flowchart 700, step 802, and/or flowchart 900 (including any suitable step of flowcharts 200, 400, 600, 700, 900), and/or further embodiments described herein.

Mobile device 1000 can support one or more input devices 1030, such as a touch screen 1032, microphone 1034, camera 1036, physical keyboard 1038 and/or trackball 1040 and one or more output devices 1050, such as a speaker 1052 and a display 1054. Touch screens, such as touch screen 1032, can detect input in different ways. For example, capacitive touch screens detect touch input when an object (e.g., a fingertip) distorts or interrupts an electrical current running across the surface. As another example, touch screens can use optical sensors to detect touch input when beams from the optical sensors are interrupted. Physical contact with the surface of the screen is not necessary for input to be detected by some touch screens. For example, the touch screen 1032 may be configured to support finger hover detection using capacitive sensing, as is well understood in the art. Other detection techniques can be used, as already described above, including camera-based detection and ultrasonic-based detection. To implement a finger hover, a user's finger is typically within a predetermined spaced distance above the touch screen, such as between 0.1 to 0.25 inches, or between .0.25 inches and 0.05 inches, or between .0.5 inches and 0.75 inches or between 0.75 inches and 1 inch, or between 1 inch and 1.5 inches, etc.

The touch screen 1032 is shown to include a control interface 1092 for illustrative purposes. The control interface 1092 is configured to control content associated with a virtual element that is displayed on the touch screen 1032. In an example embodiment, the control interface 1092 is configured to control content that is provided by one or more of applications 1014. For instance, when a user of the mobile device 1000 utilizes an application, the control interface 1092 may be presented to the user on touch screen 1032 to enable the user to access controls that control such content. Presentation of the control interface 1092 may be based on (e.g., triggered by) detection of a motion within a designated distance from the touch screen 1032 or absence of such motion. Example embodiments for causing a control interface (e.g., control interface 1092) to be presented on a touch screen (e.g., touch screen 1032) based on a motion or absence thereof are described in greater detail below.

Other possible output devices (not shown) can include piezoelectric or other haptic output devices. Some devices can serve more than one input/output function. For example, touch screen 1032 and display 1054 can be combined in a single input/output device. The input devices 1030 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 1012 or applications 1014 can comprise speech-recognition software as part of a voice control interface that allows a user to operate the device 1000 via voice commands. Further, device 1000 can comprise input devices and software that allows for user interaction via a user's spatial gestures, such as detecting and interpreting gestures to provide input to a gaming application.

Wireless modem(s) 1060 can be coupled to antenna(s) (not shown) and can support two-way communications between processor circuit 1010 and external devices, as is well understood in the art. The modem(s) 1060 are shown generically and can include a cellular modem 1066 for communicating with the mobile communication network 1004 and/or other radio-based modems (e.g., Bluetooth 1064 and/or Wi-Fi 1062). Cellular modem 1066 may be configured to enable phone calls (and optionally transmit data) according to any suitable communication standard or technology, such as GSM, 3G, 4G, 5G, etc. At least one of the wireless modem(s) 1060 is typically configured for communication with one or more cellular networks, such as a GSM network for data and voice communications within a single cellular network, between cellular networks, or between the mobile device and a public switched telephone network (PSTN).

Mobile device 1000 can further include at least one input/output port 1080, a power supply 1082, a satellite navigation system receiver 1084, such as a Global Positioning System (GPS) receiver, an accelerometer 1086, and/or a physical connector 1090, which can be a USB port, IEEE 1394 (FireWire) port, and/or RS-232 port. The illustrated components 1002 are not required or all-inclusive, as any components can be not present and other components can be additionally present as would be recognized by one skilled in the art.

Figure 11:
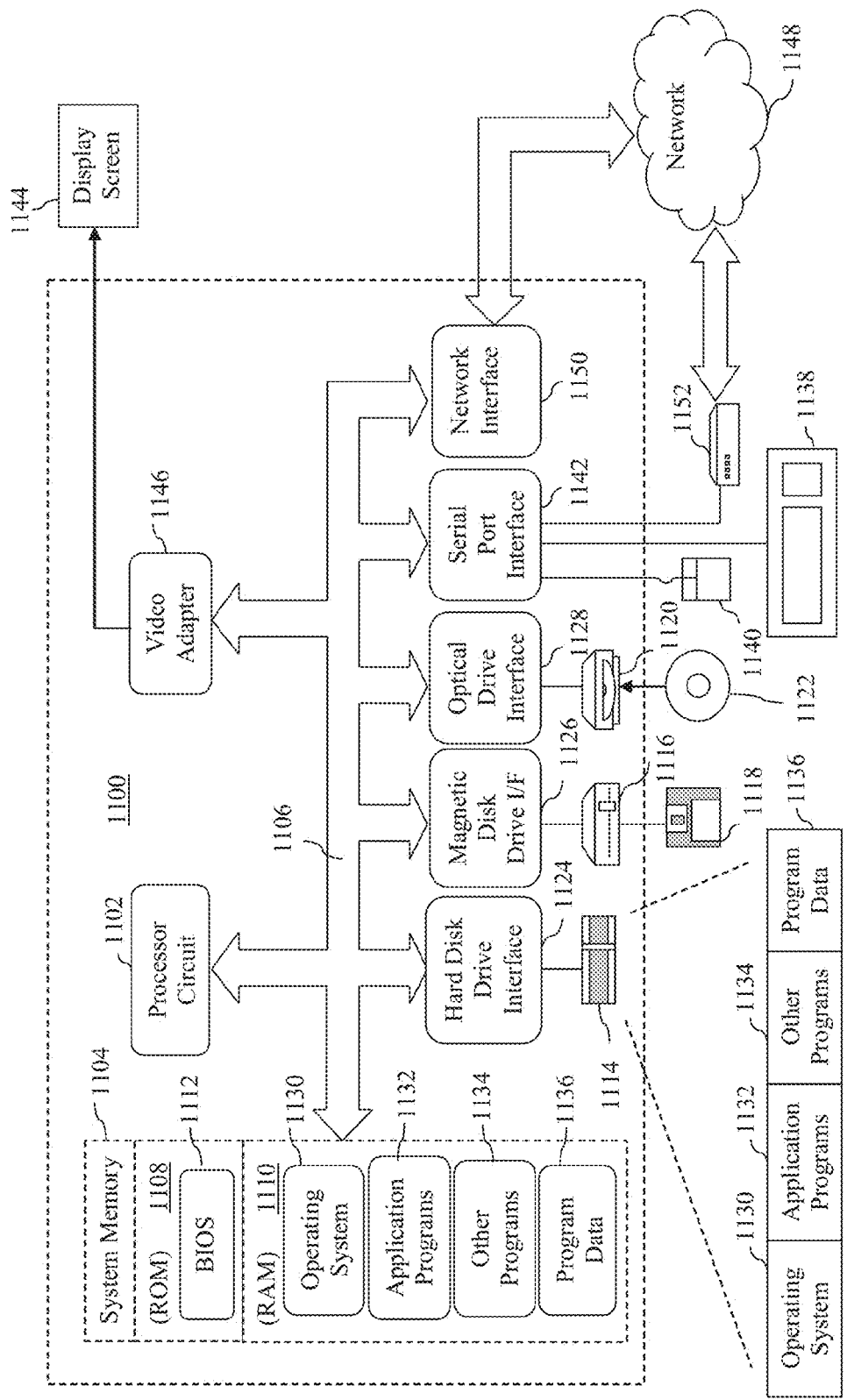
FIG. 11 shows a block diagram of an example computing device that may be used to implement embodiments.

Furthermore, FIG. 11 depicts an exemplary implementation of a computing device 1100 in which embodiments may be implemented. For example, client devices 102*a* and 102*b*, server(s) 104, application server(s) 106*a* and 106*b*, router 302, proxy server(s) 304*a* and 304*b*, VPN gateways 306*a* and 306*b*, and/or application server(s) 106*a* and 106*b* may be implemented in one or more computing devices similar to computing device 1100 in stationary computer embodiments, including one or more features of computing device 1100 and/or alternative features. The description of computing device 1100 provided herein is provided for purposes of illustration, and is not intended to be limiting. Embodiments may be implemented in further types of computer systems, as would be known to persons skilled in the relevant art(s).

As shown in FIG. 11, computing device 1100 includes one or more processors, referred to as processor circuit 1102, a system memory 1104, and a bus 1106 that couples various system components including system memory 1104 to processor circuit 1102. Processor circuit 1102 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1102 may execute program code stored in a computer readable medium, such as program code of operating system 1130, application programs 1132, other programs 1134, etc. Bus 1106 represents one or more of any of several types of bus structures, including a memory bus or memory controller, a peripheral bus, an accelerated graphics port, and a processor or local bus using any of a variety of bus architectures. System memory 1104 includes read only memory (ROM) 1108 and random access memory (RAM) 1110. A basic input/output system 1112 (BIOS) is stored in ROM 1108.

Computing device 1100 also has one or more of the following drives: a hard disk drive 1114 for reading from and writing to a hard disk, a magnetic disk drive 1116 for reading from or writing to a removable magnetic disk 1118, and an optical disk drive 1120 for reading from or writing to a removable optical disk 1122 such as a CD ROM, DVD ROM, or other optical media. Hard disk drive 1114, magnetic disk drive 1116, and optical disk drive 1120 are connected to bus 1106 by a hard disk drive interface 1124, a magnetic disk drive interface 1126, and an optical drive interface 1128, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1130, one or more application programs 1132, other programs 1134, and program data 1136. Application programs 1132 or other programs 1134 may include, for example, computer program logic (e.g., computer program code or instructions) for implementing tenants 112a and 112b, tenant mapper 114, service 118, client apps 128a and 128b, VPN service 318, tenant mapper 506, flowchart 200, flowchart 400, flowchart 600, flowchart 700, step 802, and/or flowchart 900 (including any suitable step of flowcharts 200, 400, 600, 700, 900), and/or further embodiments described herein.

A user may enter commands and information into the computing device 1100 through input devices such as keyboard 1138 and pointing device 1140. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1102 through a serial port interface 1142 that is coupled to bus 1106, but may be connected by other interfaces, such as a parallel port, game port, or a universal serial bus (USB).

A display screen 1144 is also connected to bus 1106 via an interface, such as a video adapter 1146. Display screen 1144 may be external to, or incorporated in computing device 1100. Display screen 1144 may display information, as well as being a user interface for receiving user commands and/or other information (e.g., by touch, finger gestures, virtual keyboard, etc.). In addition to display screen 1144, computing device 1100 may include other peripheral output devices (not shown) such as speakers and printers.

Computing device 1100 is connected to a network 1148 (e.g., the Internet) through an adaptor or network interface 1150, a modem 1152, or other means for establishing communications over the network. Modem 1152, which may be internal or external, may be connected to bus 1106 via serial port interface 1142, as shown in FIG. 11, or may be connected to bus 1106 using another interface type, including a parallel interface.

As used herein, the terms "computer program medium," "computer-readable medium," and "computer-readable storage medium" are used to generally refer to physical hardware media such as the hard disk associated with hard disk drive 1114, removable magnetic disk 1118, removable optical disk 1122, other physical hardware media such as RAMs, ROMs, flash memory cards, digital video disks, zip disks, MEMs, nanotechnology-based storage devices, and further types of physical/tangible hardware storage media (including memory 1020 of FIG. 10). Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media.

As noted above, computer programs and modules (including application programs 1132 and other programs 1134) may be stored on the hard disk, magnetic disk, optical disk, ROM, RAM, or other hardware storage medium. Such computer programs may also be received via network interface 1150, serial port interface 1142, or any other interface type. Such computer programs, when executed or loaded by an application, enable computing device 1100 to implement features of embodiments discussed herein. Accordingly, such computer programs represent controllers of the computing device 1100.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Example Embodiments

In one embodiment, a method in a service that supports a plurality of tenants and has one or more public IP addresses is provided, comprising: receiving a first connection string from a first client device over a network, the first connection string includes a service portion that maps to a public IP (Internet protocol) address for the service and a first tenant portion that identifies a first tenant of the service; mapping the first tenant portion of the first connection string to a gateway configured to support the first tenant; establishing a first tunnel between the gateway configured to support the first tenant and the first client device; receiving a second connection string from a second client device, the second connection string includes the same service portion as received in the first connection string that maps to the same public IP address for the service and includes a second tenant portion that identifies a second tenant of the service that is different from the first tenant; mapping the second tenant portion of the second connection string to a gateway configured to support the second tenant; and establishing a second tunnel between the gateway configured to support the second tenant and the second client device.

In an embodiment, the receiving a first connection string from a first client device over a network comprises: receiving the first connection string from the first client device according to a secure communications protocol; and establishing a first connection between the first client device and an intermediate communications component according to the secure communications protocol.

In an embodiment, the secure communications protocol is Hypertext Transfer Protocol Secure (HTTPS), and the establishing a first connection between the first client device and an intermediate communications component according to the secure communications protocol comprises: creating a transmission control protocol (TCP) connection between the intermediate communications component and the client device at a default destination port for HTTPS; and performing a HTTPS handshake between the intermediate communications component and the client device.

In an embodiment, the establishing a first tunnel between the gateway configured to support the first tenant and the first client device comprises: establishing a second connection between the intermediate communications component and the gateway configured to support the first tenant; and establishing the first tunnel through the first and second connections, application traffic enabled to flow between the first client device and application server through the first tunnel In an embodiment, the establishing the first tunnel through the first and second connections comprises: performing a secure socket tunneling protocol handshake between the first client device and the gateway configured to support the first tenant; and performing a point-to-point protocol handshake between the first client device and the gateway configured to support the first tenant.

In an embodiment, the mapping the second tenant portion of the second connection string to a gateway configured to support the second tenant comprises: mapping the second tenant portion of the second connection string to the same gateway as the first tenant portion is mapped to.

In an alternative embodiment, the mapping the second tenant portion of the second connection string to a gateway configured to support the second tenant comprises: mapping the second tenant portion of the second connection string to a different gateway than the first tenant portion is mapped to.

In another embodiment, a service that supports a plurality of tenants and has a public IP address, comprises: at least one server communicatively coupled with a plurality of gateway devices of the service, each gateway device configured to support at least one tenant, the at least one server including: a network interface configured to receive connection strings from a plurality of client devices over a network according to a secure communications protocol, and to establish a first connection with each client device according to the secure communications protocol in response to receiving a connection string from the client device, each received connection string including a service portion that maps to a public IP address of the service and a tenant portion that identifies a tenant of the plurality of tenants of the service, a plurality of received connection strings including the same service portion that maps to the same public IP address and different tenant portions; a tenant mapper configured, for each of the received connection strings, to map the tenant portion to a corresponding gateway of the plurality of gateway devices that is configured to support the corresponding identified tenant; and a gateway interface configured to communicatively interface the at least one server with the plurality of gateway devices, and for each of the received connection strings, to establish a second connection with the corresponding gateway to establish a virtual private network tunnel between the client device from which the connection string was received and the corresponding gateway.

In an embodiment, the secure communications protocol is performed according to a stack comprising at least one of SSTP (Secure Socket Tunneling Protocol), Hypertext Transfer Protocol Secure (HTTPS), Transmission Control Protocol (TCP), Internet Protocol (IP), or Point to Point Protocol (PPP), and the first connection implements communications according to one or more of SSTP, HTTPS, TCP, or IP, and the second connection implements communications according to one or more of SSTP HTTP, TCP, IP, or PPP.

In an embodiment, the at least one server includes: an intermediate communications component that includes the tenant mapper and is communicatively coupled with at least one of the gateway devices.

In an embodiment, when the tenant mapper maps the a tenant portion of a first connection string received from a first client device to a first gateway of the plurality of gateways that supports a first tenant identified by the tenant portion of the first connection string, the intermediate communications component is configured to: establish the tunnel through the first connection between the first client device and the intermediate communications component and the second connection between the intermediate communications component and the first gateway, application traffic being enabled to flow between the first client device and the application server associated with the first tenant through the tunnel.

In an embodiment, a first connection string having the service portion and a first tenant portion and a second connection string having the service portion and a second tenant portion are received, and the second tenant portion of the second connection string is mapped by the tenant mapper to the same gateway as the first tenant portion is mapped to.

In an alternative embodiment, a first connection string having the service portion and a first tenant portion and a second connection string having the service portion and a second tenant portion are received, and the second tenant portion of the second connection string is mapped by the tenant mapper to a different gateway than the first tenant portion is mapped to.

In another embodiment, a computer-readable storage medium comprising computer-executable instructions that, when executed by a processor, perform a method comprising: receiving a first connection string from a first client device over a network, the first connection string includes a service portion that maps to a public IP address for the service and a first tenant portion that identifies a first tenant of the service, the service having one or more public IP addresses; mapping the first tenant portion of the first connection string to a gateway configured to support the first tenant; establishing a first tunnel between the gateway configured to support the first tenant and the first client device; receiving a second connection string from a second client device, the second connection string includes the same service portion as received in the first connection string that maps to the same public IP address for the service and includes a second tenant portion that identifies a second tenant of the service that is different from the first tenant; mapping the second tenant portion of the second connection string to a gateway configured to support the second tenant; and establishing a second tunnel between the gateway configured to support the second tenant and the second client device.

In an embodiment, the receiving a first connection string from a first client device over a network comprises: receiving the first connection string from the first client device according to a secure communications protocol; and establishing a first connection between the first client device and an intermediate communications component according to the secure communications protocol.

In an embodiment, the secure communications protocol is HTTPS, and said establishing a first connection between the first client device and an intermediate communications component according to the secure communications protocol comprises: creating a TCP connection between the intermediate communications component and the client device at a default destination port for HTTPS; and performing a HTTPS handshake between the intermediate communications component and the client device.

In an embodiment, the establishing a first tunnel between the gateway configured to support the first tenant and the first client device comprises: establishing a second connection between the intermediate communications component and the gateway configured to support the first tenant; and establishing the first tunnel through the first and second connections, application traffic enabled to flow between the first client device and the application server through the first tunnel.

In an embodiment, the establishing the first tunnel through the first and second connections comprises: performing a secure socket tunneling protocol handshake between the first client device and the gateway configured to support the first tenant; and performing a point-to-point protocol handshake between the first client device and the gateway configured to support the first tenant.

In an embodiment, the mapping the second tenant portion of the second connection string to a gateway configured to support the second tenant comprises: mapping the second tenant portion of the second connection string to the same gateway as the first tenant portion is mapped to.

In an alternative embodiment, the mapping the second tenant portion of the second connection string to a gateway configured to support the second tenant comprises: mapping the second tenant portion of the second connection string to a different gateway than the first tenant portion is mapped to.

Note that in further embodiments, further variations may be used. For instance, although a service is frequently referred to herein when describing embodiments, embodiments may be applied to any other service. Furthermore, although HTTP is frequently referred to herein as a suitable communication protocol, any other communication protocol may be used. Still further, the tenant identifier may be provided in any suitable form, including any embodiment where a connection string contains identity/information of the tenant. Even further, any suitable secure communication protocol may be used, including SSL, etc.

V. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method in a service that supports a plurality of tenants and has one or more public IP addresses, comprising:
   receiving a first connection string from a first client device over a network, the first connection string includes a service portion that maps to an IP (Internet protocol) address for the service and a first tenant portion that identifies a first tenant of the service;
   mapping the first tenant portion of the first connection string to a first gateway configured to support the first tenant based on a first mapping in a tenant map that is a data structure that maps tenants by tenant portions to corresponding gateways;
   establishing a first tunnel between the first gateway and the first client device;
   receiving a second connection string from a second client device, the second connection string includes the same service portion as received in the first connection string that maps to the same public IP address for the service and includes a second tenant portion that identifies a second tenant of the service that is different from the first tenant;
   mapping the second tenant portion of the second connection string to a second gateway configured to support the second tenant based on a second mapping in the tenant map; and
   establishing a second tunnel between the second gateway and the second client device.

2. The method of claim 1, wherein said receiving a first connection string from a first client device over a network comprises:
   receiving the first connection string from the first client device according to a secure communications protocol; and
   establishing a first connection between the first client device and an intermediate communications component according to the secure communications protocol.

3. The method of claim 2, wherein the secure communications protocol is Hypertext Transfer Protocol Secure (HTTPS), and said establishing a first connection between the first client device and an intermediate communications component according to the secure communications protocol comprises:
   creating a transmission control protocol (TCP) connection between the intermediate communications component and the client device at a default destination port for HTTPS; and
   performing a HTTPS handshake between the intermediate communications component and the client device.

4. The method of claim 2, wherein said establishing a first tunnel between the first gateway and the first client device comprises:
   establishing a second connection between the intermediate communications component and the first gateway; and
   establishing the first tunnel through the first and second connections, application traffic enabled to flow between the first client device and application server through the first tunnel.

5. The method of claim 4, wherein said establishing the first tunnel through the first and second connections comprises:
   performing a secure socket tunneling protocol handshake between the first client device and the first gateway; and
   performing a data communications protocol handshake between the first client device and the first.

6. The method of claim 1, wherein said mapping the second tenant portion of the second connection string to a second gateway configured to support the second tenant comprises:

mapping the second tenant portion of the second connection string to the same gateway as the first tenant portion is mapped to.

7. The method of claim 1, wherein said mapping the second tenant portion of the second connection string to a second gateway configured to support the second tenant comprises:

mapping the second tenant portion of the second connection string to a different gateway than the first tenant portion is mapped to.

8. A service that supports a plurality of tenants and has one or more public IP (Internet protocol) addresses, comprising:

at least one server communicatively coupled with a plurality of gateway devices of the service, each gateway device configured to support at least one tenant, the at least one server including a network interface configured to receive connection strings from a plurality of client devices over a network according to a secure communications protocol, and to establish a first connection with each client device according to the secure communications protocol in response to receiving a connection string from the client device, each received connection string including a service portion that maps to a public IP address of the service and a tenant portion that identifies a tenant of the plurality of tenants of the service, a plurality of received connection strings including the same service portion that maps to the same public IP address and different tenant portions;

a tenant mapper configured, for each of the received connection strings, to map the tenant portion to a corresponding gateway of the plurality of gateway devices that is configured to support the corresponding identified tenant based on a mapping in a tenant map that is a data structure that maps tenants by tenant portions to corresponding gateways; and a gateway interface configured to communicatively interface the at least one server with the plurality of gateway devices, and for each of the received connection strings, to establish a second connection with the corresponding gateway to establish a tunnel between the client device from which the connection string was received and the corresponding gateway.

9. The service of claim 8, wherein the secure communications protocol is performed according to a stack comprising at least one of SSTP (Secure Socket Tunneling Protocol), Hypertext Transfer Protocol Secure (HTTPS), Transmission Control Protocol (TCP), Internet Protocol (IP), or Point to Point Protocol (PPP), and the first connection implements communications according to one or more of SSTP, HTTPS, TCP, or IP, and the second connection implements communications according to one or more of SSTP HTTP, TCP, IP, or PPP.

10. The service of claim 9, wherein the at least one server includes:

an intermediate communications component that includes the tenant mapper and is communicatively coupled with at least one of the gateway devices.

11. The service of claim 10, wherein, when the tenant mapper maps a tenant portion of a first URI received from a first client device to a first gateway of the plurality of gateways that supports a first tenant identified by the tenant portion of the first URI, the intermediate communications component is configured to:

establish the tunnel through the first connection between the first client device and the intermediate communications component and the second connection between the intermediate communications component and the first gateway, application traffic being enabled to flow between the first client device and the application server associated with the first tenant through the tunnel.

12. The service of claim 8, wherein a first URI having the service portion and a first tenant portion and a second URI having the service portion and a second tenant portion are received, and the second tenant portion of the second URI is mapped by the tenant mapper to the same gateway as the first tenant portion is mapped to.

13. The service of claim 8, wherein a first URI having the service portion and a first tenant portion and a second URI having the service portion and a second tenant portion are received, and the second tenant portion of the second URI is mapped by the tenant mapper to a different gateway than the first tenant portion is mapped to.

14. The service of claim 8, wherein the tenant mapper is implemented as logic selected from the group consisting of hardware logic, electrical circuitry, a computer program, and an integrated circuit.

15. A computer-readable storage medium comprising computer-executable instructions that, when executed by a processor, perform a method comprising:

receiving a first connection string from a first client device over a network, the first connection string includes a service portion that maps to a public IP (Internet protocol) address for a service and a first tenant portion that identifies a first tenant of the service, the service having one or more public IP addresses;

mapping the first tenant portion of the first connection string to a first gateway configured to support the first tenant based on a first mapping in a tenant map that is a data structure that maps tenants by tenant portions to corresponding gateways;

establishing a first virtual private network (VPN) tunnel between the first gateway and the first client device;

receiving a second connection string from a second client device, the second connection string includes the same service portion as received in the first connection string that maps to the same public IP address for the service and includes a second tenant portion that identifies a second tenant of the service that is different from the first tenant;

mapping the second tenant portion of the second connection string to a second gateway configured to support the second tenant based on a second mapping in the tenant map; and establishing a second tunnel between the second gateway and the second client device.

16. The computer-readable storage medium of claim 15, wherein said receiving a first connection string from a first client device over a network comprises:

receiving the first connection string from the first client device according to a secure communications protocol; and establishing a first connection between the first client device and a intermediate communications component according to the secure communications protocol.

17. The computer-readable storage medium of claim 16, wherein the secure communications protocol is Hypertext Transfer Protocol Secure (HTTPS), and said establishing a first connection between the first client device and an intermediate communications component according to the secure communications protocol comprises:

creating a transmission control protocol (TCP) connection between the intermediate communications component and the client device at a default destination port for HTTPS; and performing a HTTPS handshake between the intermediate communications component and the client device.

18. The computer-readable storage medium of claim 16, wherein said establishing the first VPN tunnel between the first gateway and the first client device comprises:

establishing a second connection between the intermediate communications component and the first gateway; and establishing the first VPN tunnel through the first and second connections, application traffic enabled to flow between the first client device and the application server through the first VPN tunnel.

19. The computer-readable storage medium of claim 18, wherein said establishing the first VPN tunnel through the first and second connections comprises:

performing a secure socket tunneling protocol handshake between the first client device and the first gateway; and performing a data communications protocol handshake between the first client device and the first gateway.

20. The computer-readable storage medium of claim 15, wherein said mapping the second tenant portion of the second connection string to a second gateway configured to support the second tenant comprises:

mapping the second tenant portion of the second connection string to the same gateway as the first tenant portion is mapped to.

21. The computer-readable storage medium of claim 15, wherein said mapping the second tenant portion of the second connection string to a second gateway configured to support the second tenant comprises:

mapping the second tenant portion of the second connection string to a different gateway than the first tenant portion is mapped to.

* * * * *